de June 27, 1950

UNITED STATES PATENT OFFICE 2,512,600

LINEAR NITROGEN-CONTAINING POLYMERIC MATERIALS AND PROCESSES FOR THEIR PRODUCTION

Harold Bates, James Wotherspoon Fisher, and Edward William Wheatley, Spondon, near Derby, England, assignors to Celanese Corporation of America, a corporation of Delaware No Drawing. Application April 16, 1946, Serial No. 662,628. In Great Britain May 10, 1945

10 Claims. (Cl. 260—78)

This invention relates to improvements in polymeric materials, and is more particularly concerned with the production of polymers suitable for the formation of filaments, films and plastic materials.

We have discovered a new series of polymers which is characterized by containing the triazole ring, and especially the 1.2.4-triazole ring or substitution products thereof, and especially amino substitution products, in the structural unit.

The structural units of the polymer are probably of the general formula

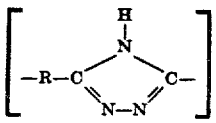

where R is a divalent organic radicle which contains no substituents or hetero atoms that interfere with the reaction, contains two terminal carbon atoms and is joined to the triazole rings through said two terminal carbon atoms. The triazole ring shown in the structural formula above may also exist in its tautomeric form

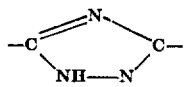

The invention includes the polymers themselves and a number of processes which we have discovered for their production. We have further found that these polymers are very resistant to hydrolysis either by alkali or acid, for example hydrochloric acid, and hence show little or no tendency to depolymerisation. Many of them have melting points which make them suitable for the production of filaments for use in textile materials, that is to say they have melting points above the usual ironing temperatures for textile fabrics.

We have found, for example, that polytriazoles may be produced by heating a mixture of a diamide of a dicarboxylic acid with at least an equimolecular proportion of a dihydrazide of a dicarboxylic acid. The dicarboxylic acids present in the diamides and dihydrazides may be those in which the two carboxylic acid groups are the sole substituent radicles in the hydrocarbon chain, for example succinic acid, glutaric acid, adipic acid, pimelic acid, suberic acid, azelaic acid, sebacic acid and the higher dicarboxylic acids of this series, diphenic acid, phenylene 1.4-diacetic acid and similar dicarboxylic acids of the aromatic series. The invention includes, however, the use of dicarboxylic acids containing substituents or hetero atoms which do not interfere with the reaction, for example diglycollic acid, N-methyl-imino-diacetic acid and similar dicarboxylic acids containing unreactive atoms in the chain. The equation for the production of simple polytriazoles requires that the diamide and the dihydrazide be used in substantially equimolecular proportions. As indicated above, we prefer to use rather more than one molecular amount of dihydrazide to one mole of diamide. Alternatively or in addition, we prefer to use a further quantity of hydrazine. For example, a mixture of equimolecular proportions of dicarboxylic acid diamide and dicarboxylic acid dihydrazide may be mixed with an amount of hydrazine equal to about 10% of the weight of the reagents. It appears probable that the dihydrazides exhibit some tendency to lose hydrazine during the condensation, and that the presence of this additional hydrazine in the reaction vessel restrains this tendency or compensates for any such loss of hydrazine.

Similar polymers may be produced by heating a mono-amide mono-hydrazide of a dicarboxylic acid, for example those mentioned above, again preferably with some free hydrazine in the reaction mixture. Further, the same or similar polymers may be produced by heating together a dicarboxylic acid, ester or anhydride and a mixture of ammonia and hydrazine, the hydrazine being present in a proportion of at least one molecule for each molecule of dicarboxylic acid or the like, and the hydrazine and ammonia together amounting to at least two molecules for each molecule of dicarboxylic acid or the like. The methyl, ethyl and phenyl esters of the above dicarboxylic acids are very suitable for this type of reaction. Again, a dicarboxylic acid dinitrile may be heated with hydrazine to produce similar polymers. Generally it appears that the dicarboxylic acid diamides and dicarboxylic acid dinitriles act effectively as if they were a mixture of ammonia and the dicarboxylic acid, and again a dicarboxylic ester or anhydride acts as if it were the dicarboxylic acid.

Generally the higher the ratio of hydrazine, combined or uncombined, to ammonia, combined or uncombined, in the reaction mixture, the higher will be the nitrogen content of the resulting polymers and the higher the melting point. For example, with sebacic acid as the dicarboxylic acid, and using hydrazine as the only base, as shown in Examples III and IV below, products having a melting point of about 250° C. can be obtained, whereas when, as in Examples I and II below, a proportion of ammonia, combined or uncombined, is present in the reaction mixture, the melting point of the resulting polymer is substantially lower, for example of the order of 190-220° C., and the nitrogen content is substantially lower. Again, with decreasing melting point and decreasing nitrogen content, solubility in methanol sets in. With the polymers from sebacic acid, those having a melting point above about 240° C. are insoluble in cold methanol, while as the melting point is brought down below about 240° C., by use of a higher ratio of ammonia, combined or uncombined, solubility in cold methanol increases.

A number of variations of the reactions already referred to may be employed. Thus we may use a dihydrazide with a diester and ammonia or a diamide with a diester and hydrazine, and similarly, instead of using a monoamide mono-hydrazide of a dicarboxylic acid, we may use a mono-amide mono-ester of a dicarboxylic acid together with hydrazine, or a mono-hydrazide mono-ester of a dicarboxylic acid with ammonia.

Instead of using a reaction mixture containing effectively ammonia or hydrazine, the reaction mixture may contain effectively a monosubstitution product of ammonia and/or hydrazine, for example a mono-alkylamine, arylamine or aralkylamine or a primary acid amide or a mono-alkyl, aryl or aralkyl hydrazine or a mono-acidylated hydrazine. In such cases, the total quantity of base present, combined or uncombined, must still be at least two moles of base to one mole of dicarboxylic acid, and of these at least one mole must consist of hydrazine or mono-substituted hydrazine, combined or uncombined, and at least one must consist of unsubstituted ammonia or unsubstituted hydrazine, combined or uncombined. This arises from the fact that the simple 1.2.4-triazole ring contains only one hydrogen atom attached to nitrogen, and its formation therefore admits of the use of only one mole of mono-substituted base and one mole of unsubstituted base, at least one of the moles being a hydrazine base.

Generally, therefore, the invention comprises the production of polymers containing triazole rings by heating a mixture containing effectively a dicarboxylic acid and a base of the formula $NH_2$—R, where R is hydrogen, an organic radicle or —NH—$R_1$, $R_1$ being hydrogen or an organic radicle, there being present at least two moles of base, combined and uncombined, of which at least one mole has the formula $NH_2.NH$—$R_2$, where $R_2$ is hydrogen or an organic radicle, and of which at least one mole has the formula $NH_2$—$R_3$, where $R_3$ is hydrogen or —$NH_2$.

The invention includes the production of polymers containing triazole rings substituted by an amino group in the 4-position, i. e. poly-4-amino-1.2.4-triazoles, by heating together a dicarboxylic acid or anhydride with hydrazine. Again in this case the proportion of hydrazine theoretically necessary is two moles of hydrazine for each mole of dicarboxylic acid or the like, but again it is preferable to use a small excess over this amount, for example the 10% excess mentioned above. Generally it is found that the use of an excess in no way limits the molecular weight attainable in the polymer. Instead of using the two moles of hydrazine to one of dicarboxylic acid, the salt of hydrazine with the dicarboxylic acid may be used, for example hydrazine sebacate.

In all the above cases, the condensation may be carried out by simple heating. Usually temperatures of the order of 200-300° C., and especially 230-280° C., are suitable for the purpose. The heating may be carried out on the undiluted reagents, or the reagents may be suspended or dissolved in a suitable diluent. The presence of water during the condensation is very beneficial, at least in the initial stages, since it appears to prevent or retard a tendency for the polymer to become resinous and insoluble, possibly by cross-linking or some other side reaction. This water may be added in the form of hydrazine hydrate or an aqueous solution of hydrazine hydrate, so that the reaction vessel contains both the water and the desirable additional hydrazine. The condensation is preferably carried out, at least in the initial stages, in a closed vessel, though in the later stages the pressure that builds up may be wholly or in part released, and further, towards the end of the condensation, the pressure may be reduced to below atmospheric pressure. This final reduction of pressure to below atmospheric pressure is not, however, necessary, and the whole condensation may be carried out in a closed vessel with periodic or continuous release of pressure, for example a release of pressure down to 300 lbs. per square inch.

While the invention includes the production of polymers of relatively low molecular weight, it is mainly addressed to the production of polymers which have film- and filament-forming properties. It is found that the ability to form filaments usually sets in when an intrinsic viscosity of 0.3-0.4 is reached, as measured in a 1% solution of the polymer in metacresol. For the best filaments the condensation is best carried to an intrinsic viscosity of at least 0.6, at which stage filaments made from the polymers usually exhibit cold-drawing properties, with consequent increase in their tensile strength measured in grams per denier.

As indicated above, the polymers are extremely stable to hydrolysing agencies and hence there is very little tendency for their viscosity to decrease. Some of them probably contain terminal hydrazide groups which are capable of further condensation. Such a tendency to further condensation may be eliminated, or in other words the viscosity of the polymer may be stabilised, by hydrolysing these terminal hydrazide groups. For example the polymer may be heated with an aqueous solution of hydrochloric acid or any other suitable mineral acid to split off the hydrazine at the ends of the chains and thus constitute carboxylic acid groups as the terminal groups. The polymer is then obtained in the form of a hydrochloride or similar salt, and the base may be recovered therefrom by suitable neutralisation of the acid. The polymer then appears to be completely stable as regards its viscosity. In the case of making a polytriazole from a diamide and dihydrazide, the use of a slight molecular excess of diamide over the amount of dihydrazide also serves to prevent increase in the degree of polymerisation above a certain amount, determined by the amount of that excess. The smaller the excess, the higher may be the molecular weight of the product. In the case of using a dicarboxylic acid or a dinitrile or a dicarboxylic ester in any of the above syntheses, a small excess of such dicarboxylic acid or derivative thereof also serves to limit the molecular weight which may be reached.

In all the above syntheses of polyaminotriazoles, some of the hydrazine, and particularly up to one mole for each mole of dicarboxylic acid or derivative thereof, may be replaced by acetyl hydrazine, propionyl hydrazine, lauryl hydrazine or other hydrazines which are substituted by one monobasic acid residue, with the object of obtaining polymers in which the exocyclic amino group is acidylated. The polymers may be aftertreated in a numbers of ways for the purpose of modifying their properties, for example increasing their melting points or decreasing their moisture regain, or even of rendering them completely insoluble in organic solvents. Those which contain amino groups may be aftertreated with acylating agents, for example formic acid reacted at waterbath temperature, or acetyl chloride applied at much the same temperature, or phenyl, naphthyl or other isocyanate reacted in boiling benzene or similar solvent, phenyl and other isothiocyanate reacted under similar conditions, or isocyanic acid or isothiocyanic acid. These two latter are preferably applied in the form of alkali salts to the hydrochloride of the polymer. Other acylating agents include cyanamide, which converts the amino group into a guanidine group, and alkyl, aryl or aralkyl cyanamides. By employing an acidylating agent which contains two or more acidylating groups, the polymer may be rendered infusible and insoluble in all organic solvents. Such agents include di- and poly-carboxylic acids, di- and poly-isocyanates and di- and poly-isothiocyanates. In a similar way the polymers may be aftertreated with carbonyl compounds, including both aldehydes and ketones, for example formaldehyde, acetaldehyde, benzaldehyde, acetophenone, furfural and the like. Here again reagents may be used which contain two or more reactive groups, for example dialdehydes, diketones, aldehydo-ketones, aldehydo-carboxylic acids or keto-carboxylic acids, e. g. levulinic acid. It will be appreciated that both with the acidylating agents and with the carbonyl compounds, reaction may take place with a small proportion or a large proportion of the amino groups disposed along the polymer chain. The polymers so treated thus contain both modified and unmodified structural units.

Insolubilising treatments carried out with reagents containing two or more reactive groups are preferably applied to the polymers after they have been shaped, for example formed into filaments, films or the like.

The invention includes the production of filaments, films and other articles from the polymers produced as described above. The filaments may be produced by melt spinning, i. e. by extruding a melt of the polymer through suitable orifices. In general the temperature of the polymer to be extruded should be some 10–30° above the melting point of the polymer. This melting temperature may be modified to some extent, e. g. with a view to reducing any tendency to decomposition during spinning at very high temperatures, by mixing the polymer with suitable proportions of plasticisers, for example sulphonamide plasticisers, phenol plasticisers, urea and thiourea plasticisers and the like. Such plasticisers may either be left in the products or may be partially or completely extracted therefrom. Filaments may also be produced by wet or dry spinning methods from solutions in suitable solvents, for example formic acid or acetic acid or the phenolic solvents referred to above.

The filaments so formed may, if the polymer be of sufficiently high molecular weight, be drawn out at comparatively low temperatures, or even at atmospheric temperature, to very fine filaments having high tenacity and good elasticity. The resulting filaments may then be used for any of the purposes to which artificial silks have in the past been applied. Generally the products have an affinity for the dispersed insoluble type of dyestuff now generally applied to cellulose acetate, while those which contain a basic amino group attached to the triazole ring exhibit an affinity for the acid wool colours.

While the invention is especially directed to the manufacture and application of fibre-forming polymers, it is not limited thereto and embraces the production of similar polymers suitable, for example, for use as softening agents, coatings, film-forming substances, and the like. Moreover, for these applications the polymers of the present invention may be mixed with other fibre-forming, film-forming or lacquer substances or other ingredients, for example cellulose acetate, acetobutyrate, butyrate and aceto-stearate, ethyl cellulose, oxyethyl cellulose, oxyethyl cellulose acetate, benzyl cellulose and other cellulose derivatives, plasticisers or softening agents, dyestuffs, pigments and the like.

The following examples illustrate the invention but are not to be considered as limiting it.

Example I 80 parts of sebacic diamide and 92 parts of sebacic dihydrazide were intimately mixed together and heated in an autoclave with 100 parts by weight of 50% aqueous hydrazine hydrate for 2 hours at 200° C., followed by 2 hours at 250–260° C. The mixture was then further heated for half an hour at 260° C. under a pressure of 5 mms. of mercury. The product was capable of yielding filaments from the melt and had an intrinsic viscosity of 0.57 measured in a 1% solution in meta-cresol. On attempting to hydrolyse the product with hydrochloric acid, substantially no hydrolysis to sebacic acid occurred.

Example II 92 parts by weight of sebacic dihydrazide and 40 parts by weight of sebacic diamide were heated together in an autoclave with 100 parts by weight of 50% aqueous hydrazine hydrate. As in Example I, the heating was carried out for 2 hours at 200° C. and then for a further 2 hours at 250–260° C., and finally for 30 minutes at 260° C. under a pressure of 5 mms. of mercury. The product again gave fibres from the melt and had an intrinsic viscosity of 0.58.

Example III 100 parts by weight of hydrazine sebacate and 60 parts by weight of 50% aqueous hydrazine hydrate were heated for 2 hours at 260° C. in an autoclave. The heating was then continued for a further 2 hours at 260° C. while limiting the pressure by release to about 250 lbs. The product had a melting point of about 250° C. and an intrinsic viscosity of 0.51, and was readily capable of yielding filaments from the melt which could be cold drawn.

Example IV 100 parts by weight of sebacic acid and 110 parts by weight of 50% aqueous hydrazine hydrate were heated together in an autoclave for 2 hours at 260° C. and then for a further 2 hours at the same temperature while releasing the pressure to 500 lbs. per square inch. The product had an intrinsic viscosity of 0.36 and yielded long filaments from the melt.

*Example V*

A dope was prepared by dissolving 450 gms. of the polymer prepared according to Example III above in 100 parts of orthophenyl phenol and 200 parts of meta-cresol under nitrogen. The cresol was then allowed to boil off. The product cooled to a hard mass. The mixture was then introduced into a melt spinning crucible fitted just in front of the spinneret with a filter screen of one layer of 150 mesh phosphor bronze gauze and two layers of 300 mesh phosphor bronze gauze. The spinneret had a diameter of 0.2 mm. The spinning crucible was heated by an electrically heated lead bath to a temperature of 250° C. A nitrogen pressure of 300 lbs. per square inch was applied and the extruded filaments wound up on a cheese former. The product had an extremely high lustre and exhibited good cold-drawing properties.

Having described our invention, what we desire to secure by Letters Patent is:

1. Process for the production of a nitrogen-containing polymer, which comprises heating together a diamide and a dihydrazide of a dicarboxylic acid free from reactive goups other than the carboxy groups together with hydrazine, the amount of hydrazine present, combined and uncombined, being sufficiently more than one mole for each dicarboxylic acid residue present to produce a polymer resistant to hydrolysis by hydrochloric acid, and continuing the heating until the polymer is produced.

2. Process for the production of a nitrogen-containing polymer, which comprises heating together sebacic diamide and sebacic dihydrazide and hydrazine, the total hydrazine present, combined and uncombined, being sufficiently more than one mole for each mole of sebacic acid present to produce a polymer resistant to hydrolysis by hydrochloric acid, and continuing the heating until the polymer is produced.

3. Process for the production of a nitrogen-containing polymer, which comprises heating together a diamide and a dihydrazide of a dicarcoxylic acid free from reactive groups other than the carboxy groups together with hydrazine, the amount of hydrazine present, combined and uncombined, being sufficiently more than one mole for each dicarboxylic acid residue present to produce a polymer resistant to hydrolysis by hydrochloric acid, and continuing the heating until the polymer has fibre-forming properties.

4. Process for the production of a nitrogen-containing polymer, which comprises heating together sebacic diamide and sebacic dihydrazide and hydrazine, the total hydrazine present, combined and uncombined, being sufficiently more than one mole for each mole of sebacic acid present to produce a polymer resistant to hydrolysis by hydrochloric acid, and continuing the heating until the polymer has fibre-forming properties.

5. Process for the production of a nitrogen-containing polymer, which comprises heating a reaction mixture, which on complete hydrolysis contains a mixture of a dicarboxylic acid free from reactive groups other than the carboxy groups, hydrazine and ammonia, the hydrazine and ammonia together being present in a proportion of more than two moles for each mole of dicarboxylic acid and the hydrazine being present in a proportion of more than one mole for each mole of dicarboxylic acid, the excess of hydrazine and ammonia above two moles for each mole of dicarboxylic acid and the excess of hydrazine above one mole for each mole of dicarboxylic acid being in an amount sufficient to produce a polymer resistant to hydrolysis by hydrochloric acid, and continuing the heating until the polymer is produced.

6. Process for the production of a nitrogen-containing polymer, which comprises heating a reaction mixture, which on complete hydrolysis contains a mixture of a dicarboxylic acid free from reactive groups other than the carboxy groups, hydrazine and ammonia, the hydrazine and ammonia together being present in a proportion of more than two moles for each mole of dicarboxylic acid and the hydrazine being present in a proportion of more than one mole for each mole of dicarboxylic acid, the excess of hydrazine and ammonia above two moles for each mole of dicarboxylic acid and the excess of hydrazine above one mole for each mole of dicarboxylic acid being in an amount sufficient to produce a polymer resistant to hydrolysis by hydrochloric acid, and continuing the heating until the polymer has fibre-forming properties.

7. Process for the production of a nitrogen-containing polymer, which comprises heating a reaction mixture, which on complete hydrolysis contains a mixture of a polymethylene dicarboxylic acid free from reactive groups other than the carboxy groups, hydrazine and ammonia, the hydrazine and ammonia together being present in a proportion of more than two moles for each mole of polymethylene dicarboxylic acid and the hydrazine being present in a proportion of more than one mole for each mole of polymethylene dicarboxylic acid, the excess of hydrazine and ammonia above two moles for each mole of polymethylene dicarboxylic acid and the excess of hydrazine above one mole for each mole of polymethylene dicarboxylic acid being in an amount sufficient to produce a polymer resistant to hydrolysis by hydrochloric acid, and continuing the heating until the polymer is produced.

8. A linear nitrogen-containing polymer characterized by being substantially resistant to the hydrolyzing action of boiling hydrochloric acid, and consisting of structural units of the general formula

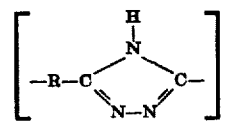

where R is a divalent organic radicle free from reactive groups and having two terminal carbon atoms and R is joined to the triazole rings through said terminal carbon atoms.

9. A linear nitrogen-containing polymer characterized by being substantially resistant to the hydrolyzing action of boiling hydrochloric acid and consisting of structural units of the general formula

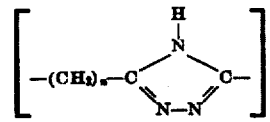

where $n$ is an integer having a value of least 2.

10. A linear nitrogen-containing polymer characterized by being substantially resistant to the hydrolyzing action of boiling hydrochloric acid, and consisting of structural units of the general formula

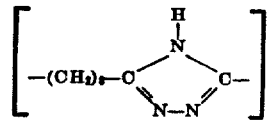

HAROLD BATES.
JAMES WOTHERSPOON FISHER.
EDWARD WILLIAM WHEATLEY.

REFERENCES CITED

The following references are of record in the file of this patent:

UNITED STATES PATENTS

| Number | Name | Date |
| --- | --- | --- |
| 2,218,077 | Zerweck et al. | Oct. 15, 1940 |
| 2,332,303 | D'Alelio | Oct. 19, 1943 |
| 2,349,979 | Moldenhauer et al. | May 30, 1944 |
| 2,395,642 | Prichard | Feb. 26, 1946 |